US011463862B2

(12) United States Patent
Mote et al.

(10) Patent No.: US 11,463,862 B2
(45) Date of Patent: Oct. 4, 2022

(54) SYSTEM AND METHOD FOR AVAILING A DATA SERVICE BY A USER EQUIPMENT

(71) Applicant: JIO PLATFORMS LIMITED, Ahmedabad (IN)

(72) Inventors: Ganesh Arjun Mote, Kalyan (IN); Shraddha Subhash Birare, Dombivli (IN)

(73) Assignee: Jio Platforms Limited, Ahmedabad (IN)

( * ) Notice: Subject to any disclaimer, the term of this patent is extended or adjusted under 35 U.S.C. 154(b) by 0 days.

(21) Appl. No.: 16/644,931

(22) PCT Filed: Sep. 6, 2018

(86) PCT No.: PCT/IB2018/056788
§ 371 (c)(1),
(2) Date: Mar. 5, 2020

(87) PCT Pub. No.: WO2019/049052
PCT Pub. Date: Mar. 14, 2019

(65) Prior Publication Data
US 2021/0029531 A1  Jan. 28, 2021

(30) Foreign Application Priority Data

Sep. 8, 2017 (IN) .............................. 201721031877

(51) Int. Cl.
*H04W 8/04* (2009.01)
*H04W 60/00* (2009.01)
(52) U.S. Cl.
CPC ........... *H04W 8/04* (2013.01); *H04W 60/005* (2013.01)

(58) Field of Classification Search
CPC ........ H04W 8/04; H04W 60/006; H04W 8/12
See application file for complete search history.

(56) References Cited

U.S. PATENT DOCUMENTS

| 2002/0002048 A1* | 1/2002 | Vaisanen | H04W 8/06 |
| | | | 455/432.1 |
| 2006/0221986 A1* | 10/2006 | Berg | H04W 48/17 |
| | | | 370/401 |

(Continued)

OTHER PUBLICATIONS

3rd Generation Partnership Project; Technical Specification Group Core Network; Numbering, addressing and identification (Release 5). 3GPP TS 23.003 V5.11.0 (Jun. 2006). (Year: 2006).*

(Continued)

*Primary Examiner* — Erica Navar
(74) *Attorney, Agent, or Firm* — Klarquist Sparkman, LLP

(57) ABSTRACT

The present disclosure encompasses a system and a method for availing a data service by a user equipment [110] in an international location. In an embodiment, the user equipment [110], in the international roaming, transmits an attach request to a second network, wherein the user equipment [110] configured with a SIM [120]. The user equipment [110] then receives a rejection message or an acceptance message from the second network based on the attach request. On receiving the acceptance message, the user equipment [110] establishes a connection with the second network to extract an IMPI from the SIM, an IMSI from the IMPI; and a network parameter from the IMSI. The user equipment [110] then identifies a configuration parameter of the home network, corresponding to the network parameter. Finally, the user equipment [110] avails the data service using the configuration parameter.

12 Claims, 3 Drawing Sheets

(56) References Cited

U.S. PATENT DOCUMENTS

| | | | |
|---|---|---|---|
| 2007/0043947 A1* | 2/2007 | Mizikovsky | H04W 12/0433 |
| | | | 713/172 |
| 2013/0102306 A1 | 4/2013 | Sachanandani | |
| 2015/0358806 A1* | 12/2015 | Salqvist | H04W 8/12 |
| | | | 455/433 |
| 2016/0295544 A1 | 10/2016 | Jiang et al. | |

OTHER PUBLICATIONS

Kumar, "Multi Imsi Subscription Based Mobile Service," International Journal of Scientific and Research Publications, vol. 5, ISSN 2250-3153, Jul. 7, 2015, 2 pages.

International Search Report, PCT/IB2018/056788, dated Jan. 2, 2019, 3 pages.

Written Opinion, PCT/IB2018/056788, dated Jan. 2, 2019, 4 pages.

* cited by examiner

SYSTEM AND METHOD FOR AVAILING A DATA SERVICE BY A USER EQUIPMENT

CROSS REFERENCE TO RELATED APPLICATIONS

This is the U.S. National Stage of International Application No. PCT/IB2018/056788, filed Sep. 6, 2018, which was published in English under PCT Article 21(2), which in turn claims the benefit of Indian Application No. 201721031877, filed Sep. 8, 2017. Both applications are incorporated herein by reference in their entirety.

FIELD OF INVENTION

The present disclosure generally relates to mobile communications and is more specifically, directed to system and method for availing data services by a user device based on a preserved APN setting.

BACKGROUND

A typical contemporary wireless network is deployed to provide various communication services including, but not limiting to, video, data, advertisement, content, messaging and broadcast. The network has usually multiple access networks to support communications for multiple users by sharing the available network resources. The earlier UTRAN is the radio access network (RAN) was defined as a part of the Universal Mobile Telecommunications System (UMTS), a third generation (3G) mobile phone technology supported by the 3rd Generation Partnership Project (3GPP). The UMTS technology, which is the successor to Global System for Mobile Communications (GSM) technologies, currently supports various air interface standards, such as W-CDMA, Time Division-Code Division Multiple Access (TDCDMA), and Time Division-Synchronous Code Division Multiple Access (TDSCDMA). Also, the UMTS supports enhanced 3G data communications protocols such as the HSPA that provides higher data transfer speeds and capacity to associated UMTS networks. With increase in the demand for mobile data and voice access, these technologies are upgrading not only to meet the growing demand for access but also to enhance the user experience with a user device. One such advanced technology is Evolved Universal Terrestrial Radio Access (E-UTRA) which is a radio access network standard and is considered as a replacement of the UMTS and High Speed Downlink Packet Access/High Speed Uplink Packet Access (HSDPA/HSUPA) technologies covered under the 3GPP standards. The E-UTRA of the Long Term Evolution (LTE) is an entirely new air interface system, unlike the High Speed Packet Access (HSPA), which is unrelated and incompatible with the wireless code division multiple access (W-CDMA). In addition, the E-UTRA not only provides higher data rate and lower latency but is also optimized for packet data. Thus, E-UTRA provides a single evolution path for providing enhancement in the data speeds, and spectral efficiency and allowing the provision of more functionality.

Recently, there has been an immense proliferation of wireless devices ecosystem that provides both voice and data services simultaneously and is therefore, becoming popular particularly in the countries where there are plurality of service providers. For instance, a mobile device allows the user to implement different service plans or service providers on the same mobile device. Also, the mobile device allows the user to obtain services while travelling outside the operating zones where the user may obtain roaming services in those zones or targeted destinations. The user may take advantage of different pricing plans for data and voice and save on the voice and the data usage in roaming scenarios. In light of this, Original Equipment Manufacturer (OEM) companies have begun with exploring more options in the mobile devices/user equipment with both voice and data and with multi-SIM ecosystem with two antennas on receiver (Rx) path. Autonomously, the devices have been evolved from a single SIM device to a multi SIM device, thereby leading to development of Dual SIM Dual Standby (DSDS) solution/feature where the mobile device is capable to receive network on second SIM slot even when there is on-going activity in the first SIM.

A typical SIM card ecosystem comprises an integrated circuit chip intended to securely store the international mobile subscriber identity (IMSI) number and its related key, which are used to identify and authenticate subscribers on mobile telephony devices (such as mobility devices like the smartphones, tabs, laptops, computers, etc.). Said SIM cards (transferable between different mobile devices) are generally used in GSM smartphones, CDMA smartphones as well as new LTE-capable handsets. The SIM circuit is a part of the function of a Universal Integrated Circuit Card (UICC) physical smart card, which is usually made of PVC with embedded contacts and semiconductors. Thus, the SIM may be configured in a mobile device or any smart device in the form of a chip card and contains essential individual subscriber data that is required for facilitating mobile services.

A typical SIM card consists of a microprocessor, a I/O interface towards the UE, RAM, an EEPROM/Non Volatile Memory (NVM) and its file system. The EEPROM consists of an operating system code along with code of other applications such as code of Auto International mobile subscriber identity (IMSI) Switch SIM application. An USIM application residing in the SIM file system, contains elementary files (EF) such as $EF_{LOCI}$, $EF_{PLOCI}$, $EF_{EPSLOCI}$, $EF_{UST}$, $EF_{FPLMN}$, etc. along with application specific files such as context and configuration files of Auto IMSI Switch SIM application used by SIM applications running on the SIM. In a typical user equipment, various subsystems may also be present such as modem subsystem, Baseband DSP processor, RF section and other radio interfaces, an application processor, a memory subsystem, a power subsystem and external input-output (I/O) interfaces subsystems.

Every network operator has a unique Public Land Mobile Network (PLMN) number that consists of a Mobile Country Code (MCC) and a Mobile Network Code (MNC). Thus, each subscriber of the user equipment is identified by the unique IMSI which consists of the PLMN (MCC, MNC) of the network operator and a Mobile Subscription Identification Number (MSIN). In addition, the SIM card contains its unique serial number (ICCID), international mobile subscriber identity (IMSI) number, security authentication, ciphering information, temporary information related to the local network, a list of the services the user has access to and passwords such as personal identification number (PIN) for ordinary use, a personal unblocking code (PUK) for PIN unlocking, etc.

Further, the user equipment may comprise proprietary files indicating status of a device connection which gets generated in system memory of device. Said device contains apns-conf.xml file comprising a list of worldwide Access Point Name (APN) mapped with MCC/MNC, wherein said xml file or similar mechanism may be present inside the device telephony Application Programming Interface (API)

of a modem layer of the device that provides APIs for monitoring the basic phone information such as the network type, the connection state and gets information about MCC/MNC. The format of said xml file may as follows:

```
<?xml version="1.0" encoding="UTF-8"?>
<apns version="8">
<apn type="default,supl" apn="internet" mnc="01" mcc="202"
carrier="Cosmote Wireless Internet"/>
<apn type="mms" apn="mms" mnc="01" mcc="202" carrier="Cosmote
Mms" mmsport="8080" mmsproxy="10.10.10.20"
mmsc="http://mmsc.cosmote.gr:8002"/>
<apn type="default,supl,dun" apn="internet.vodafone.gr"
mnc="05" mcc="202" carrier="Vf Mobile Internet"/>
<apn type="mms" apn="mms.vodafone.net" mnc="05" mcc="202"
carrier="Vf MMS" mmsport="5080" mmsproxy="213.249.19.49"
mmsc="http://mms.vodafone.gr" password="pass"
user="user"/>
<apn type="default" apn="jionet" mnc="871" mcc="405"
carrier="Internet" roaming_protocol="IPV4V6"
protocol="IPV4V6"/>
<apn type="default" apn="jionet" mnc="872" mcc="405"
carrier="Internet" roaming_protocol="IPV4V6"
protocol="IPV4V6"/>
<apn type="default" apn="jionet" mnc="873" mcc="405"
carrier="Internet" roaming_protocol="IPV4V6"
protocol="IPV4V6"/>
<apn type="default" apn="5 jionet" mnc="874" mcc="405"
carrier="Internet" roaming_protocol="IPV4V6"
protocol="IPV4V6"/>
<!-- RJIL apns end -->
</apns>
```

The PLMN contained in the subscriber's IMSI is called Home PLMN (HPLMN) and the corresponding network is referred to as Home Network (HN). When a subscriber of an operator tries to attach to another network operator due to various reasons like unavailability of home network, etc. it is identified as a Roaming Subscriber (RS) and that network operator is referred to as Roamed Network (RN) herein. The roaming subscriber can access the roamed network services as per the bilateral roaming agreements between the home and the roamed network operators.

As the SIM card is inserted in the device, the Home IMSI (containing MCC, MNC of the home network) is written in ADF_USIM/6F07 file of SIM that indicates home country. The ADF_USIM/6F07 file has expected IMSI which can be either Home IMSI or roaming/global/foreign IMSI depending upon on which network device is latched. The home IMSI will be used in a foreign country while roaming in an event the home operator has a tie up with a foreign local Mobile Network Operator (MNO) which has a limited coverage in said foreign country (bilateral agreement). However, in cases where the foreign network/country does not have bilateral agreement, the global IMSI will be used instead of the home IMSI. Therefore, it is essential to provide good quality roaming network for maintaining a network operator's brand value for roaming services for both voice and data. The roaming subscribers also amount to a significant revenue for network operators. In case of the international roaming, where the home network operator may not have a bilateral roaming agreement with the network operator in the international location into which the subscriber is roaming, the Auto IMSI Switch SIM application helps in providing services by swapping the IMSI of the home network operator in the SIM card with an IMSI of a Global Network Operator. With the updated IMSI, network attach attempt of the subscriber's User Equipment (UE) like smartphones, etc. can be easily accepted by the roamed network and the subscriber can enjoy services in roaming on his UE.

In accordance with TS 23.401 and with IR.88 conformance, a successful functioning of the Auto IMSI Switch SIM application in international roaming requires two prerequisites for swapping of the home IMSI with the global IMSI. Firstly, the Auto IMSI Switch SIM application is able to detect the rejection in attempting to the available foreign network by the UE. Secondly, the SIM application should be able to affirm that the UE is in an international location. If the network rejection information and UE's location information is received by the SIM application, then the application can swap the Home IMSI with Global IMSI and vice versa.

Further, a SIM based standalone application (e.g. dual IMSI) is capable of managing two IMSIs for a subscriber in one SIM card, wherein one IMSI is for home network (MNO) while other IMSI is for International Roaming. The switching between the IMSIs is handled automatically by the application depending on the location by SIM applet. If the user equipment is in home country, it continues connection using Home IMSI and gets registered over Home network. Or else, if the user equipment is in foreign country, the SIM applet (out of scope) gets triggered and switches the Home IMSI to global IMSI after receiving the network rejection, pursuant to which the user equipment attempts to register with the global IMSI and gets registered over the global network. Thus, the UE handset modifies its roaming behaviour based on suitable files present in the SIM like IMSI, FPLMN, LOCI related files in accordance with the telecom standards TS 23.401.

There are various conventional techniques such as SIM based standalone application (e.g. dual IMSI) designed to modify said roaming behaviour and select APN. In one of the conventional approaches, IMSI is an integral part of APN selection. Here, when the UE is powered ON, active IMSI is selected which could be either Home IMSI or global IMSI. The UE extracts MCC/MNC parameters from the active IMSI and subsequently selects APN based on the extracted MCC/MNC. In case of international roaming, active IMSI will be global IMSI and therefore, the global IMSI will send its own configuration/setting containing APN settings. This concept is called Open Mobile Alliance-Client Provisioning (OMA-CP). Also, billing of data usage is done using offline charging mechanism. On selection of the APN settings, the UE establishes a PDP connection using the APN of the global IMSI. Later, charging information for network resource usage is collected concurrently with that resource usage in the global network, basis on which charging data records (CDR) files are generated and transferred to the home network operator's Billing Domain (BD) for the purpose of subscriber billing and/or inter-operator accounting (or additional functions, e.g. statistics, at the operator's discretion). Said offline charging is a mechanism where charging information does not affect, in real-time, the service rendered. Therefore, by this conventional technique, the service operator uses the global operator for providing roaming services to its customers (UE in international roaming). Although the voice services are directly available for the UE due to its compatibility with the Circuit Switched (CS) network, however, the data services require initialization of Access Point Name (APN) with respective to the global IMSI which may not be allowed. In particular, when the UE is powered on in the international roaming, the UE can avail the data services only after the installation of the APN configuration settings that are sent by the OMA-CP server. However, said installation may cause delay in availing of the data services due to various factors such as not receiving APN settings intermittently due to network failure, etc., thereby leading to bad user experience.

Accordingly, in order to overcome the aforementioned problems inherent in the existing solutions for availing data services, there exists a need of an efficient mechanism to avail the data services a seamless manner immediately after switching of the IMSIs (home to global and vice versa) by extracting the IMSI from the IMPI.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for availing at least one data service by a user equipment, the method being performed by the user equipment. The method comprises transmitting an attach request to a second network in an event the user equipment is in an international roaming, wherein the user equipment is configured with a subscriber identity module (SIM) having a home international mobile subscriber identity (IMSI) and a global IMSI, the second network belongs to a foreign location, and the attach request comprises one of the home IMSI and the global IMSI; receiving one of a rejection message and an acceptance message from the second network, wherein the rejection message is received in an event the attach request comprises the home IMSI and the home IMSI is absent in a subscriber list of the second network, and the acceptance message is received in an event the attach request comprises the global IMSI; establishing a connection between the user equipment and the second network in an event the acceptance message is received; extracting an IP multimedia private identity (IMPI) from the SIM, wherein the IMPI contains the home IMSI; extracting at least one network parameter from the home IMSI contained in the IMPI; identifying at least one configuration parameter, of the home network, corresponding to the at least one network parameter, wherein the at least one configuration parameter and the at least one network parameter are preconfigured in the user equipment; transmitting the at least one configuration parameter to the second network; and availing the at least one data service using the at least one configuration parameter in an event the second network in coordination with the first network authenticates the at least one configuration parameter.

Further, the embodiments of the present disclosure encompass a user equipment for availing at least one data service. The user equipment comprises a transceiver configured to: transmit an attach request to a second network in an event the user equipment is in an international roaming, wherein the user equipment is configured with a subscriber identity module (SIM) having a home international mobile subscriber identity (IMSI) and a global IMSI, the second network belongs to a foreign location, and the attach request comprises one of the home IMSI and the global IMSI; receive one of a rejection message and an acceptance message from the second network, wherein the rejection message is received in an event the attach request comprises the home IMSI and the home IMSI is absent in a subscriber list of the second network, and the acceptance message is received in an event the attach request comprises the global IMSI, and establish a connection between the user equipment and the second network in an event the acceptance message is received; a processing unit configured to: extract an IP multimedia private identity (IMPI) from the SIM, wherein the IMPI contains the home IMSI, extract at least one network parameter from the home IMSI contained in the IMPI, and identify at least one configuration parameter, of the home network, corresponding to the at least one network parameter, wherein the at least one configuration parameter and the at least one network parameter are preconfigured in a storage unit of the user equipment; wherein the transceiver is configured to: transmit the at least one configuration parameter to the second network; and avail the at least one data service using the at least one configuration parameter in an event the second network in coordination with the first network authenticates the at least one configuration parameter.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
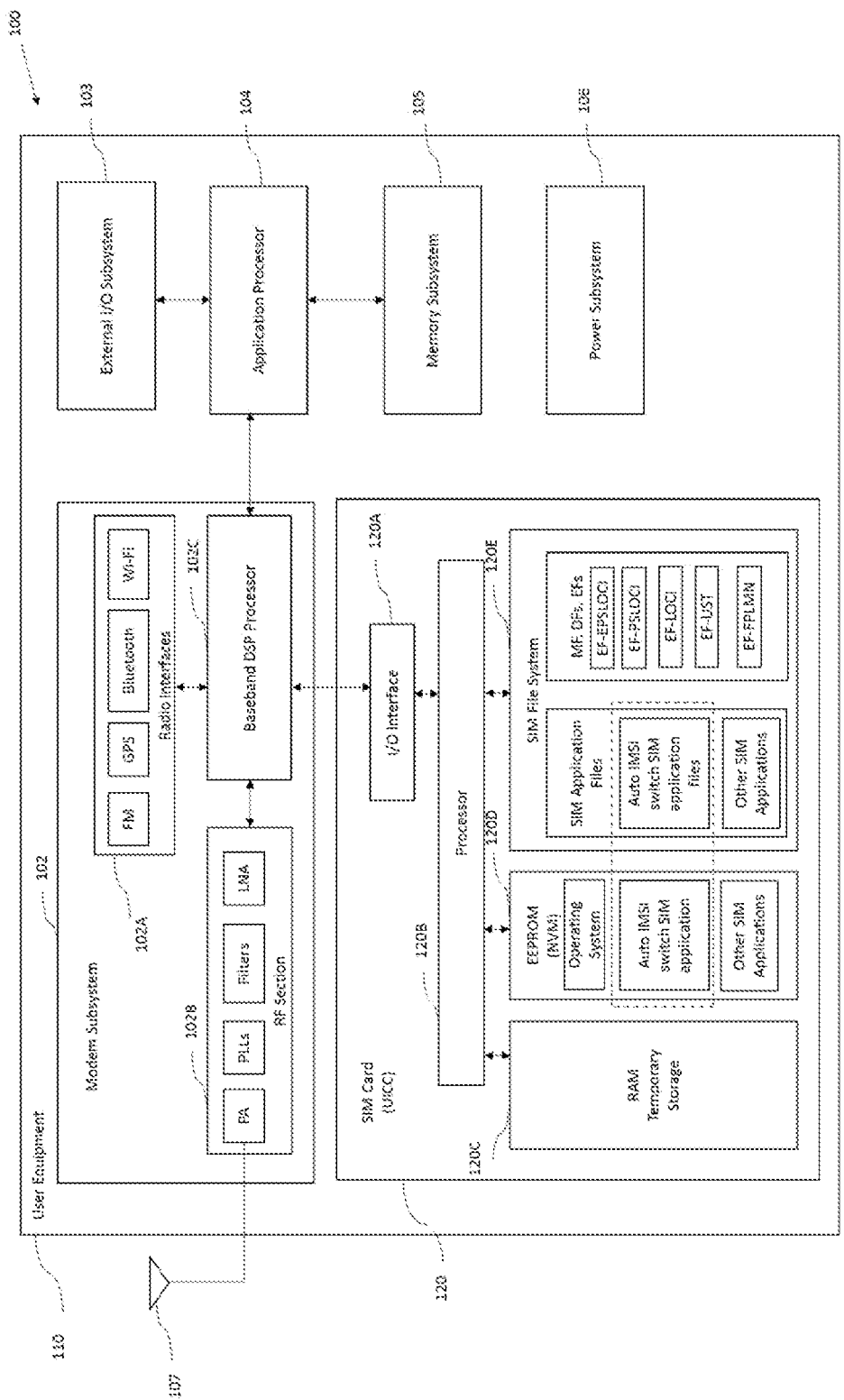
FIG. 1 illustrates an exemplary high level architecture of a system [100] for availing at least one data service by a user equipment while in an international roaming in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a system and method for availing a data service by a user equipment when the user (using said user equipment) is in an international roaming. The system comprises the User Equipment (UE) and a Subscriber Identity Module (SIM), wherein the SIM is configured inside the user equipment for providing functionalities in accordance with the present disclosure. While travelling in the international roaming i.e. from a home location (first network) to a foreign location (second network), the user equipment, having a home IMSI and a global IMSI, transmits an attach request to the second network, wherein the attach request comprises one of the home IMSI and the global IMSI. In case the attach request comprises the home IMSI which is not indicated in an allowable subscriber list of the second network, the user equipment receives a rejection from the second network. Similarly, in case the attach request comprises the global IMSI, the user equipment receives an acceptance from the second network, pursuant to which the user equipment establishes a connection with the second network. In order to select a configuration parameter, the user equipment [110] may utilise an IP multimedia private identity (IMPI) instead of the second network. Thus, the user equipment then extracts the IMPI from the SIM, wherein the IMPI contains the home IMSI, since the IMPI corresponds to the home network only. The user equipment further extracts a network parameter from the IMSI contained in the IMPI to identify the corresponding configuration parameter of the home network. Said configuration parameter is then transmitted to the second network such that the user equipment avails the data services in an event said configuration parameter is authenticated by the first network as well as the second network.

The user equipment as used herein may refer to any computing device operable with a subscriber identity module (SIM), wherein the SIM comprises an IMSI, a unique key shared with the network operator. The user equipment present in a home location may have a home IMSI, while the user equipment present in an international location (second location) may have a global IMSI. Further, the user equipment includes, but not limited to, a smart phone, a mobile phone, a tablet, a phablet and any such device as obvious to a person skilled in the art. Furthermore, the user equipment may comprise an input means such as a keyboard, an operating system, a memory unit, a display interface, etc. which may be configured to function/communicate with other entities such as base station or any such network equipment with the help of the subscriber identity module. Furthermore, the user equipment may have one or two subscriber identity modules configured to operate either one at a time or all at the same.

The first location as used herein may refer to the home location of the subscriber identity module, wherein the first location is served by the first network i.e. the first network provides the at least one data service to the user equipment located in the home location.

The second location as used herein may refer to any international or foreign location other than the home location of the subscriber identity module, wherein the second location is served by at least one second network i.e. the at least one second network provides the at least one data service to the user equipment located in the second location.

The international roaming as used herein may refer to any event when the user equipment avails services while travelling outside the geographical coverage area of the home location.

The at least one data service as used herein may include at least one of a multimedia service, a multimedia broadcast multicast service (MBMS), multimedia broadcast unicast service, a 2G service, a 3G service and a VoIP service.

FIG. 1 illustrates a preferred embodiment of the present disclosure which encompasses a high level architecture of a system [100] for availing at least one data service by the user equipment when a user (using the user equipment [110]) is either in an international roaming or is leaving the international roaming. The system [100] may comprise the user equipment [110] and the subscriber identity module (SIM) [120] configured inside the user equipment [110] for providing various functionalities in accordance with the present disclosure. The user equipment further may comprise a plurality of sub systems [102, 102A, 120B, 102C, 103, 104, 105 and 106], wherein said subsystems [102, 102A, 120B, 102C, 103, 104, 105 and 106] may include, but not limiting to, a modem subsystem [102] with a Baseband DSP processor [102C] and a plurality of radio interfaces [102A]. The user equipment [110] may further include a cellular radio [102B] transmission/reception radio frequency (RF) connected to the antenna for receiving and transmitting wireless services such as VoIP and Internet/Intranet services. Also, the user equipment [110] may comprise an application processor [104], a memory subsystem [105], a power subsystem [106] and an external I/O interfaces subsystem [103]. The present disclosure further encompasses that the subscriber identity module [120] may comprise a processor [120B], an I/O interface [120A], a RAM temporary storage [120C], an EEPROM/Non-volatile Memory (NVM) [120D] and a SIM file system [120E]. Further, the EEPROM/Non-Volatile Memory (NVM) [120D] may consist of an operating system code, a code of other SIM applications and the Auto IMSI Switch SIM application. The SIM file system [120E] and USIM application may contain elementary files and location parameters such as EFLOCI (Location Information), EFPSLOCI (PS Location Information), EFEPSLOCI (PS Location Information) and various application specific files used by SIM applications running on the subscriber identity module [120] along with a plurality of context and configuration files of the Auto IMSI Switch SIM application. The present disclosure also encompasses storage of information related to the home IMSI and the global IMSI in the Auto IMSI Switch SIM application.

Figure 2:
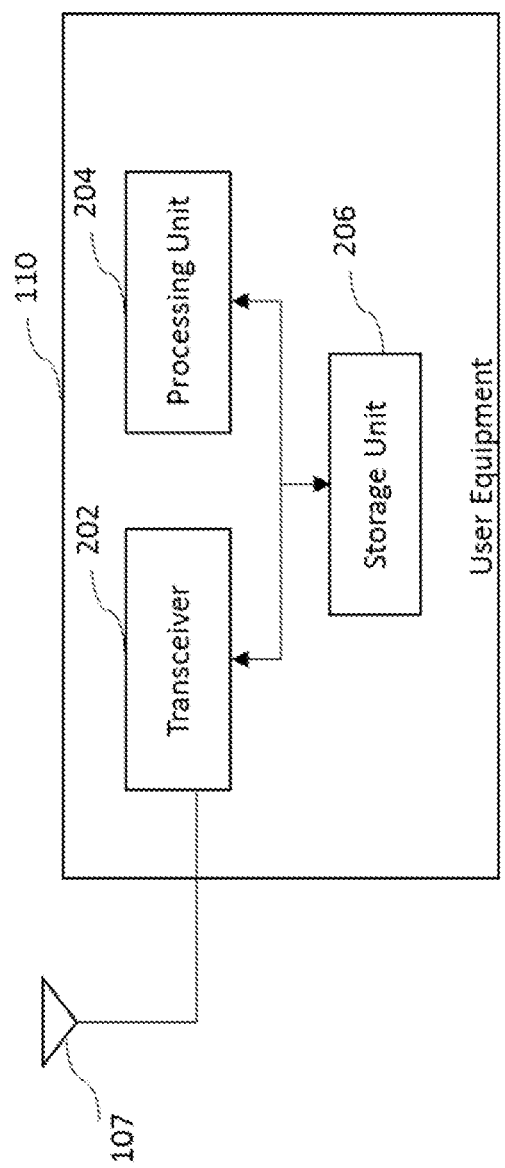
FIG. 2 illustrates an exemplary a user equipment [110] for availing at least one data service by a user equipment while in an international roaming in accordance with an embodiment of the present disclosure.

More particularly, and as illustrated in FIG. 1 and FIG. 2, the user equipment [110] may comprise a transceiver [202], a processing unit [204] and a storage unit [206] that may be connected to each other in accordance with the embodiments of the present disclosure. In an event, the user having the user equipment [110] enters into the international roaming while travelling from the home location to the foreign location, the user equipment [110] may not be able to avail the data services since the IMSI of the subscriber identity module [120] remains unchanged and the user [110] having the home IMSI may not be permitted to avail services from the second location. The transceiver [202] of the user equipment [110] having the home IMSI and the global IMSI may therefore be configured to transmit an attach request to the second network, wherein the attach request may comprise one of the home IMSI and the global IMSI. In an instance, if the user is travelling from the user's home location (e.g. India) to a foreign location (e.g. Australia), the IMSI at that time will be home IMSI. In another instance, if the user is now travelling from the foreign location (e.g. Australia) to another location apart from the home location (e.g. Canada), then the IMSI at that time will be global IMSI only and not the home IMSI, since the user didn't go back to its home location from Australia. Thus, the user equipment [110] while in India has the home IMSI and similarly the user equipment [110] while in any foreign location (except India) has the global IMSI.

The transceiver [202] of the user equipment [110] may further receive one of a rejection message and an acceptance message in response to the attach request from the second network. The rejection message may be received in an event the home network operator may not have the bilateral roaming agreement with the network operator in the global location into which the user/subscriber is roaming. More particularly, the rejection message may be received in an event, the attach request comprises the home IMSI that is absent in the subscriber list of the second network. In an embodiment, said subscriber list comprises at least one IMSI corresponding to the foreign location i.e. the subscriber list may comprise those IMSI that may be allowable for the international roaming and availing the at least one data service. In another embodiment, said subscriber list may be defined by the second network based on previous attempts. In an event, the rejection message is received, the user equipment [110] may be configured to switch the home IMSI with the global IMSI and may subsequently transmit the global IMSI in the attach request to the second network. On the other hand, the acceptance message may be received from the second network in an event the attach request itself comprises the global IMSI i.e. the user equipment [110] present in the foreign location has the global IMSI only and therefore there may be no need to switch the IMSI's.

Further, on receiving the acceptance message from the second network, the transceiver [202] may be configured to establish a connection with the second network. Pursuant to the successful connection between the user equipment [110] and the second network, the transceiver [202] may be configured to communicate said acceptance message internally to the processing unit [204] of the user equipment [110].

The processing unit [204] of the user equipment [110] may be configured to extract the IMPI from the SIM, wherein the IMPI contains the home IMSI. In an embodiment, the IMPI's format may be Home IMSI @ domain name according to the 3GPP TS 23.003 standard. Further, the processing unit [204] may be configured to further extract the at least one network parameter (MCC, MNC) from the IMSI contained in the IMPI. Thus, since the IMPI contains the home IMSI, the at least one network parameter also corresponds to the home IMSI.

Thereafter, the processing unit [204] may be configured to identify at least one configuration parameter corresponding to the at least one network parameter and thus the home IMSI. The at least one configuration parameter may comprise the access point name (APN). In an embodiment, the at least one configuration parameter and the at least one network parameter may be pre-configured in the storage unit [206] of the user equipment [110]. In an exemplary embodiment, the at least one configuration parameter may be identified using the apns-conf.xml files contained in the user equipment, wherein the apns-conf.xml files may comprise the at least one configuration setting against each of the at least one network parameter, i.e. once the at least one network parameter is extracted, the corresponding at least one configuration parameter (APN) may be identified. Thus, the APN of the home network may be identified, thereby eliminating the need to receive the APN from the network and minimising the delay.

On identifying the at least one configuration parameter, the transceiver [202] may be configured to transmit the at least one configuration parameter to the second network that may be configured to authenticate the at least one configuration parameter to check if said at least one configuration parameter actually corresponds to the home network. Eventually, on authentication, the second network asks the home network if the subscriber having said at least one configuration parameter is allowed to avail the at least one data service. Therefore, since the home APN is used by the user equipment [110] while the user is in the international roaming network, the user equipment [110] may directly connect to the home network authentication, billing purposes of data usage, etc. instead of sending CDRs to home network. The home network then authenticates said subscriber to allow the subscriber to avail the at least one data service based on various parameters such as APN, an account usage quota (e.g. balance), etc. In an embodiment, on receiving a network resource usage request from the second network, the home network assembles the relevant charging information and generates a charging event towards the OCS in real-time.

Pursuant to the authentication by the home network and the second network, the transceiver of the user equipment [110] may be configured to avail the at least one data service including, but not limiting to, the multimedia service, the multimedia broadcast multicast service (MBMS), the multimedia broadcast unicast service, the 2G service, the 3G service and the VoIP service.

Figure 3:
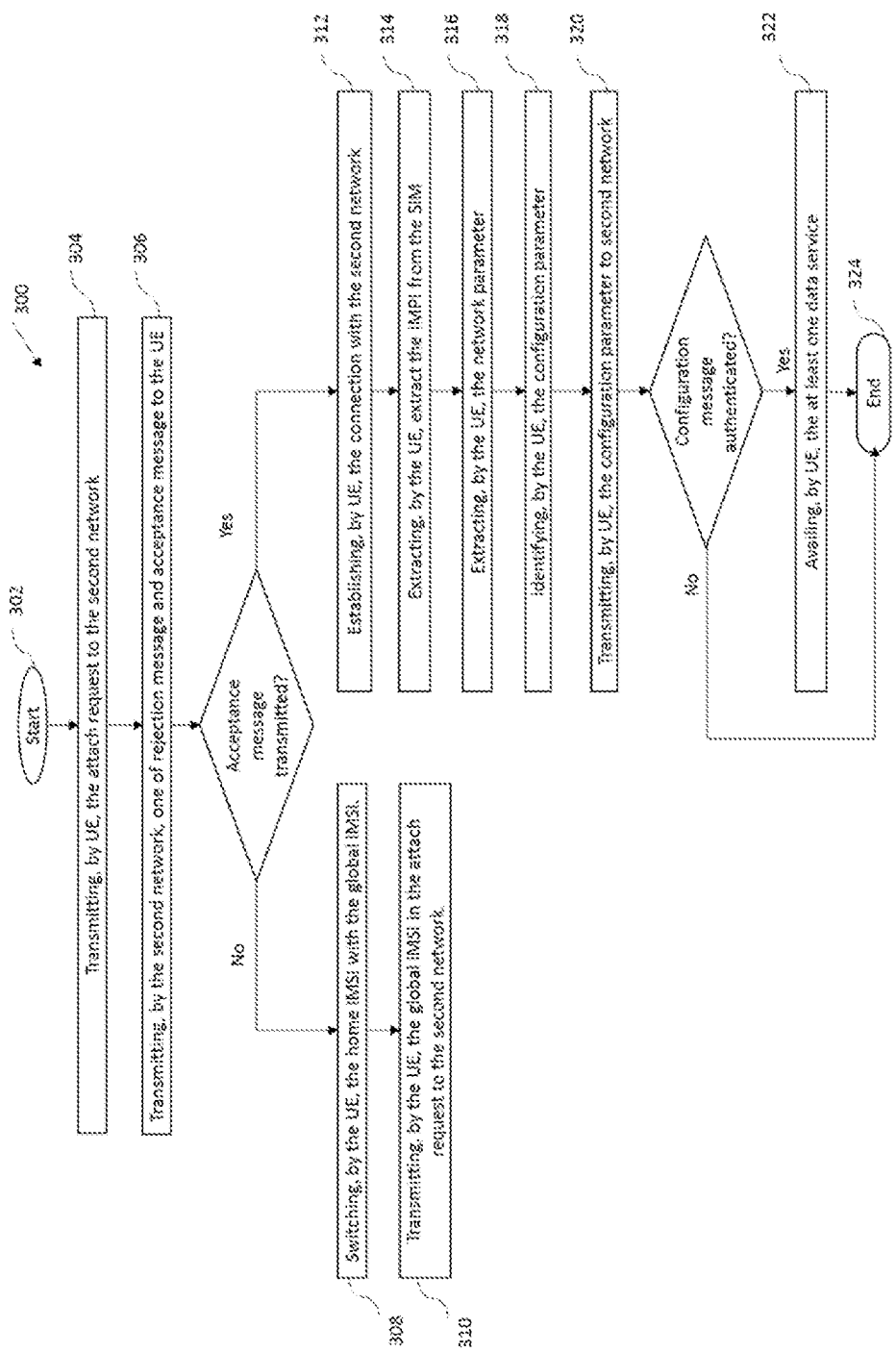
FIG. 3 illustrates an exemplary method flow diagram [300] comprising the method for availing at least one data service by a user equipment while in an international roaming in accordance with an embodiment of the present disclosure.

As illustrated in FIG. 3, the present disclosure encompasses an exemplary method [300] for availing the at least one data service by the user equipment [110] in accordance with an embodiment of the present disclosure, wherein the method [300] may be performed by the user equipment [110]. The method [300] may initiate at step 302 where the user having the user equipment [110] with the home IMSI or global IMSI travels from the first location to the second location while entering the international roaming. The user having the user equipment enters into the international roaming while travelling from the home location to the foreign location, and may not be able to avail any services since the IMSI of the subscriber identity module remains home IMSI.

At step 304, the transceiver [202] may transmit the attach request to the second network, wherein the attach request may comprise one of the home IMSI and the global IMSI. At step 306, on receiving the attach request, the second network may transmit one of the rejection message and the acceptance message to the transceiver [202]. In an event the rejection message is received, the method [300] may lead to step 308. Alternatively, the method [300] may lead to step 312.

At step 308, on receiving the rejection message from the second network, the transceiver [202] of the user equipment [110] may switch the home IMSI with the global IMSI. Said rejection message may be received in an event the home network operator may not have said bilateral roaming agreement, or the attach request comprises the home IMSI that is absent in the subscriber list of the second network, the second network transmits the rejection message.

At step 310 and pursuant to accomplishment of said switching in step 308, the transceiver [202] may transmit the global IMSI in the attach request to the second network.

At step 312, on receiving the acceptance message from the second network, the transceiver may establish the connection with the second network. Said acceptance message may be received in an event the attach request itself comprises the global IMSI. Pursuant to successful connection between the user equipment [110] and the second network, the transceiver [202] may be configured to communicate said acceptance message internally to the processing unit of the user equipment [110].

At step 314, the processing unit [204] may extract the IMPI from the SIM, wherein the IMPI contains the home IMSI.

At step 316, the processing unit [204] may extract the at least one network parameter (MCC, MNC) from the IMSI contained in the IMPI. Thus, since the IMPI contains the home IMSI, the at least one network parameter also corresponds to the home IMSI.

Thereafter, at step 318, the processing unit [204] may identify the at least one configuration parameter corresponding to the at least one network parameter and thus the home IMSI, wherein the at least one configuration parameter may comprise the access point name (APN).

Said at least one configuration parameter may be internally communicated to the transceiver of the user equipment [110].

At step 320, the transceiver [202] may be configured to transmit the at least one configuration parameter to the second network for authentication. In an event the second network authenticates the at least one configuration parameter to check if said at least one configuration parameter actually corresponds to the home network, the second network asks the home network if the subscriber having said at least one configuration parameter is allowed to avail the at least one data service. In an event, the at least one configuration parameter is allowed by the UE, the method may lead to step 322. Alternatively, the method may terminate at step 324.

At step 322, the transceiver [202] may avail the at least one data service including, but not limiting to, the multimedia service, the multimedia broadcast multicast service (MBMS), the multimedia broadcast unicast service, the 2G service, the 3G service and the VoIP service.

Therefore, the present disclosure encompasses a mechanism for availing the data services by the user equipment when the user is either in the international roaming. The present disclosure further encompasses providing the user equipment [110] with the configuration parameter (APN) immediately when the user equipment gets latched to the roaming network without waiting for APN settings from the foreign/roaming networks. Thus, the present disclosure not only provides improved and seamless services to the user equipment [110], but also reduces complexities of network interworking when the user equipment [110] moves in the international roaming. In addition, present disclosure encompasses direct interaction of the user equipment and the second network.

Though a limited number of the user equipment [110], the subscriber identity module [120] and the components/sub systems therein, have been shown in the figures; however, it will be appreciated by those skilled in the art that the system [100] of the present disclosure encompasses any number and varied types of the entities/elements user equipment [110], the subscriber identity module [120] and the components/sub systems therein.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method for availing at least one data service by a user equipment, the method being performed by the user equipment, the method comprising:

transmitting an attach request to a second network when the user equipment is in an international roaming, wherein
the user equipment is configured with a subscriber identity module (SIM) having a home international mobile subscriber identity (IMSI) and a global IMSI, the second network belongs to a foreign location, and the attach request comprises one of the home IMSI and the global IMSI;

receiving one of a rejection message and an acceptance message from the second network, wherein
the rejection message is received when the attach request comprises the home IMSI and the home IMSI is absent in a subscriber list of the second network, and
the acceptance message is received when the attach request comprises the global IMSI;

establishing a connection between the user equipment and the second network when the acceptance message is received; and while the user equipment is in the international roaming and connected to the second network:
extracting an IP multimedia private identity (IMPI) from the SIM, wherein the IMPI contains the home IMSI;
extracting at least one network parameter from the home IMSI contained in the IMPI;
identifying at least one configuration parameter, of a home network, corresponding to the at least one network parameter, wherein the at least one configuration parameter and the at least one network parameter are preconfigured in the user equipment;
transmitting the at least one configuration parameter to the second network, wherein the at least one configuration parameter comprises an access point name (APN) of the home network;
directly connecting to the home network for billing purposes using, at least in part, the home APN; and
availing the at least one data service using the at least one configuration parameter when the second network in coordination with the home network authenticates the at least one configuration parameter, wherein the second network performs the authentication by checking with the home network whether the home APN provided by the user equipment is allowed to access the at least one data service.

2. The method as claimed in claim 1, further comprising switching the home IMSI with the global IMSI, and transmitting the global IMSI in the attach request when the rejection message is received from the second network.

3. The method as claimed in claim 1, wherein the at least one data service includes at least one of a multimedia service, a multimedia broadcast multicast service (MBMS), a multimedia broadcast unicast service, a 2G service, a 3G service and a VoIP service.

4. The method as claimed in claim 1, wherein the subscriber list comprises at least one IMSI corresponding to the foreign location.

5. The method as claimed in claim 1, wherein the at least one network parameter comprises at least one of a mobile country code (MCC) and a mobile network code (MNC).

6. A user equipment for availing at least one data service, the user equipment comprising:
a transceiver configured to:
transmit an attach request to a second network when the user equipment is in an international roaming, wherein the user equipment is configured with a subscriber identity module (SIM) having a home international mobile subscriber identity (IMSI) and a global IMSI, the second network belongs to a foreign location, and the attach request comprises one of the home IMSI and the global IMSI;

receive one of a rejection message and an acceptance message from the second network, wherein the rejection message is received when the attach request comprises the home IMSI and the home IMSI is absent in a subscriber list of the second network, and the acceptance message is received when the attach request comprises the global IMSI, and establish a connection between the user equipment and the second network when the acceptance message is received;

a processing unit configured to:

while the user equipment is in the international roaming and connected to the second network:

extract an IP multimedia private identity (IMPI) from the SIM, wherein the IMPI contains the home IMSI, extract at least one network parameter from the home IMSI contained in the IMPI, and identify at least one configuration parameter, of a home network, corresponding to the at least one network parameter, wherein the at least one configuration parameter and the at least one network parameter are preconfigured in a storage unit of the user equipment;

wherein the transceiver is configured to, while the user equipment is in the international roaming and connected to the second network:

transmit the at least one configuration parameter to the second network, wherein the at least one configuration parameter comprises an access point name (APN) of the home network;

directly connect to the home network for billing purposes using, at least in part, the home APN; and avail the at least one data service using the at least one configuration parameter when the second network in coordination with the home network authenticates the at least one configuration parameter, wherein the second network performs the authentication by checking with the home network whether the home APN provided by the user equipment is allowed to access the at least one data service.

7. The user equipment as claimed in claim 6, wherein the processing unit is further configured to switch the home IMSI to the global IMSI, and transmit the global IMSI in the attach request when the rejection message is received from the second network.

8. A method for availing at least one data service by a user equipment, the method being performed by the user equipment, the method comprising:

transmitting an attach request to a second network when the user equipment is in an international roaming, wherein the user equipment is configured with a subscriber identity module (SIM) having a home international mobile subscriber identity (IMSI) and a global IMSI, the second network belongs to a foreign location, and the attach request comprises one of the home IMSI and the global IMSI;

receiving one of a rejection message and an acceptance message from the second network, wherein the rejection message is received when the attach request comprises the home IMSI and the home IMSI is absent in a subscriber list of the second network, and the acceptance message is received when the attach request comprises the global IMSI;

establishing a connection between the user equipment and the second network when the acceptance message is received;

while the user equipment is in the international roaming and connected to the second network:

extracting at least one network parameter from the home IMSI contained in an IP multimedia private identity (IMPI), wherein the IMPI contains the home IMSI;

identifying at least one configuration parameter, of a home network, corresponding to the at least one network parameter, wherein the at least one configuration parameter and the at least one network parameter are preconfigured in the user equipment;

transmitting the at least one configuration parameter to the second network, wherein the at least one configuration parameter comprises an access point name (APN) of the home network;

directly connecting to the home network for billing purposes using, at least in part, the home APN; and availing the at least one data service using the at least one configuration parameter when the second network in coordination with the home network authenticates the at least one configuration parameter, wherein the second network performs the authentication by checking with the home network whether the home APN provided by the user equipment is allowed to access the at least one data service.

9. The method as claimed in claim 8, further comprising switching the home IMSI with the global IMSI, and transmitting the global IMSI in the attach request when the rejection message is received from the second network.

10. The method as claimed in claim 8, wherein the at least one data service includes at least one of a multimedia service, a multimedia broadcast multicast service (MBMS), a multimedia broadcast unicast service, a 2G service, a 3G service and a VoIP service.

11. The method as claimed in claim 8, wherein the subscriber list comprises at least one IMSI corresponding to the foreign location.

12. The method as claimed in claim 8, wherein the at least one network parameter comprises at least one of a mobile country code (MCC) and a mobile network code (MNC).

* * * * *